United States Patent
Abe

(10) Patent No.: US 12,524,928 B2
(45) Date of Patent: Jan. 13, 2026

(54) FACE IMAGE GENERATION DEVICE

(71) Applicant: NTT DOCOMO, INC., Chiyoda-ku (JP)

(72) Inventor: Momoko Abe, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 159 days.

(21) Appl. No.: 18/557,877

(22) PCT Filed: Feb. 9, 2022

(86) PCT No.: PCT/JP2022/005194
§ 371 (c)(1),
(2) Date: Oct. 27, 2023

(87) PCT Pub. No.: WO2022/230298
PCT Pub. Date: Nov. 3, 2022

(65) Prior Publication Data
US 2024/0221238 A1    Jul. 4, 2024

(30) Foreign Application Priority Data

Apr. 30, 2021 (JP) .................................. 2021-077491

(51) Int. Cl.
*G09G 5/00* (2006.01)
*G06T 7/00* (2017.01)
(Continued)

(52) U.S. Cl.
CPC ............ *G06T 11/00* (2013.01); *G06T 7/0002* (2013.01); *G06V 40/168* (2022.01); *G06T 2207/30201* (2013.01)

(58) Field of Classification Search
CPC ......... G06T 11/60; G06T 11/40; G06T 19/00; G06T 11/00; G06T 11/20; G06T 11/206;
(Continued)

(56) References Cited

U.S. PATENT DOCUMENTS

2005/0175234 A1* 8/2005 Sakamoto ................ G02C 5/00
382/154
2016/0210602 A1* 7/2016 Siddique ................ G16H 10/60
(Continued)

FOREIGN PATENT DOCUMENTS

JP         2010-17360 A         1/2010

OTHER PUBLICATIONS

English translation of International Preliminary Report on Patentability and Written Opinion Issued Nov. 9, 2023 in PCT/JP2022/005194, 5 pages.

(Continued)

*Primary Examiner* — Gordon G Liu
(74) *Attorney, Agent, or Firm* — Oblon, McClelland, Maier & Neustadt, L.L.P.

(57) ABSTRACT

A face image generation device includes: a first face image acquiring unit configured to acquire a first face image to which makeup corresponding to a first pattern has been applied by a user; a feature extracting unit configured to extract features of the makeup of the user on the basis of the first face image and first standard data relating to features of standard makeup corresponding to the first pattern; a second face image generating unit configured to generate a second face image to which makeup corresponding to a second pattern has been applied by reflecting the features of the makeup of the user extracted by the feature extracting unit in second standard data relating to features of standard makeup corresponding to the second pattern; and a presentation unit configured to present the second face image generated by the second face image generating unit to the user.

7 Claims, 12 Drawing Sheets

| FIRST CONVERTED FACE IMAGE ||
|---|---|
| MAKEUP TARGET PORTION | EYEBROW |
| USE | GOING-OUT TIME |
| ATTRIBUTE | FEMALE IN 10'S |
| PARAMETER | VALUE |
| LENGTH | 5.5cm +0.5σ |
| POSITION (CENTER OF GRAVITY COORDINATES) | (2cm, 11cm) +2σ IN HEIGHT DIRECTION |
| THICKNESS | 1cm ±0σ |
| ⋮ | ⋮ |

| FIRST STANDARD DATA |||
|---|---|---|
| MAKEUP TARGET PORTION | EYEBROW ||
| USE | GOING-OUT TIME ||
| ATTRIBUTE | FEMALE IN 10'S ||
| PARAMETER | AVERAGE | DISPERSION σ |
| LENGTH | 5cm | 1.0cm |
| POSITION (CENTER OF GRAVITY COORDINATES) | (2cm, 10cm) | 0.5cm |
| THICKNESS | 1cm | 0.2cm |
| ⋮ | ⋮ | ⋮ |

(51) Int. Cl.
*G06T 11/00* (2006.01)
*G06V 40/16* (2022.01)

(58) Field of Classification Search
CPC ......... G06T 7/0012; G06T 2207/10081; G06T 2207/30004; G06T 11/203; G06T 2211/441; G06T 2210/28; G06T 11/001; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G11B 27/10; H04N 21/47217; G16H 30/20; G06N 20/20; G06N 3/045; G06N 3/047; G06N 3/08; G06Q 30/0643
USPC .................................................. 345/610, 619
See application file for complete search history.

(56) References Cited

U.S. PATENT DOCUMENTS

| | | | |
|---|---|---|---|
| 2017/0076474 A1* | 3/2017 | Fu | G06T 11/00 |
| 2020/0082158 A1* | 3/2020 | Hussain | G06T 7/11 |
| 2021/0264204 A1* | 8/2021 | Charraud | G06V 10/82 |
| 2022/0058377 A1* | 2/2022 | Baek | G06T 9/002 |

OTHER PUBLICATIONS

International Search Report Issued Apr. 19, 2022, in PCT/JP2022/005194, Feb. 9, 2022, therein, 2 pages.

* cited by examiner

Fig.2

| NO. | MAKEUP TARGET PORTION | PARAMETER |
|---|---|---|
| 1 | MASCARA | • LENGTH<br>• THICKNESS<br>• DEPTH<br>• POSITION |
| 2 | EYESHADOW | • DEPTH<br>• POSITION |
| 3 | EYEBROW | • LENGTH<br>• THICKNESS<br>• DEPTH<br>• POSITION |
| 4 | LIP (LIPSTICK) | • THICKNESS<br>• DEPTH<br>• POSITION |
| 5 | POWDER APPLIED TO FACE (MAKEUP POWDER) | • DEPTH |
| 6 | MAKEUP BASE | • DEPTH |
| 7 | FOUNDATION | • DEPTH |
| 8 | CHEEK | • DEPTH<br>• POSITION<br>• VERTICAL AND HORIZONTAL WIDTH |
| 9 | EYELINE | • LENGTH<br>• THICKNESS<br>• DEPTH<br>• POSITION |

| MAKEUP TARGET PORTION | EYEBROW | |
|---|---|---|
| USE | GOING-OUT TIME | |
| ATTRIBUTE | FEMALE IN 10'S | |
| PARAMETER | AVERAGE | DISPERSION σ |
| LENGTH | 5cm | 1.0cm |
| POSITION (CENTER OF GRAVITY COORDINATES) | (2cm, 10cm) | 0.5cm |
| THICKNESS | 1cm | 0.2cm |
| ... | ... | ... |

(B)

| MAKEUP TARGET PORTION | EYEBROW | |
|---|---|---|
| USE | FOR SCHOOL | |
| ATTRIBUTE | FEMALE IN 10'S | |
| PARAMETER | AVERAGE | DISPERSION σ |
| LENGTH | 4.5cm | 0.8cm |
| POSITION (CENTER OF GRAVITY COORDINATES) | (2cm, 10cm) | 0.5cm |
| THICKNESS | 0.8cm | 0.2cm |
| ... | ... | ... |

Fig.4

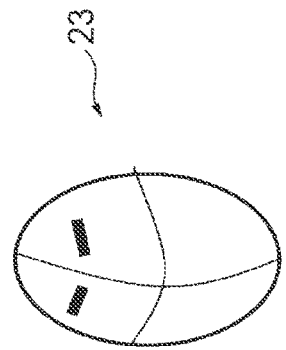

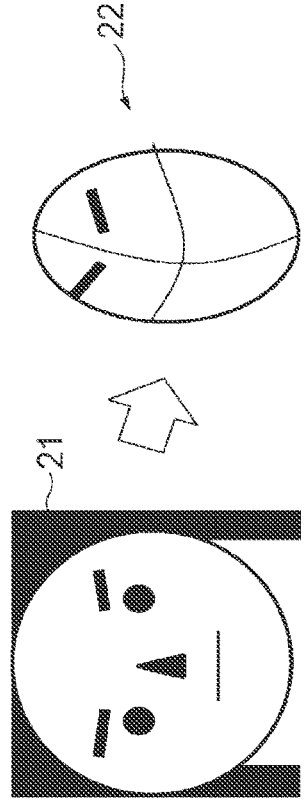

| FIRST CONVERTED FACE IMAGE | |
|---|---|
| MAKEUP TARGET PORTION | EYEBROW |
| USE | GOING-OUT TIME |
| ATTRIBUTE | FEMALE IN 10'S |
| PARAMETER | VALUE |
| LENGTH | 5.5cm ±0.5σ |
| POSITION (CENTER OF GRAVITY COORDINATES) | (2cm, 11cm) ±2σ IN HEIGHT DIRECTION |
| THICKNESS | 1cm ±0σ |
| ... | ... |

| FIRST STANDARD DATA | | |
|---|---|---|
| MAKEUP TARGET PORTION | EYEBROW | |
| USE | GOING-OUT TIME | |
| ATTRIBUTE | FEMALE IN 10'S | |
| PARAMETER | AVERAGE | DISPERSION σ |
| LENGTH | 5cm | 1.0cm |
| POSITION (CENTER OF GRAVITY COORDINATES) | (2cm, 10cm) | 0.5cm |
| THICKNESS | 1cm | 0.2cm |
| ... | ... | ... |

Fig.5

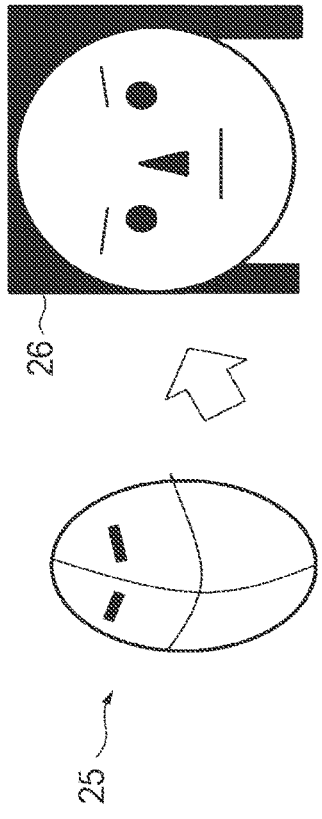

| SECOND STANDARD DATA | | |
|---|---|---|
| MAKEUP TARGET PORTION | EYEBROW | |
| USE | FOR SCHOOL | |
| ATTRIBUTE | FEMALE IN 10'S | |
| PARAMETER | AVERAGE | DISPERSION $\sigma$ |
| LENGTH | 4.5cm | 0.8cm |
| POSITION (CENTER OF GRAVITY COORDINATES) | (2cm, 10cm) | 0.5cm |
| THICKNESS | 0.8cm | 0.2cm |
| ... | ... | ... |

| SECOND CONVERTED FACE IMAGE | |
|---|---|
| MAKEUP TARGET PORTION | EYEBROW |
| USE | FOR SCHOOL |
| ATTRIBUTE | FEMALE IN 10'S |
| PARAMETER | VALUE |
| LENGTH | 4.9cm  4.5+0.5$\sigma$ |
| POSITION (CENTER OF GRAVITY COORDINATES) | (2cm, 11cm) HEIGHT DIRECTION :10+2$\sigma$ |
| THICKNESS | 0.8cm STANDARD |
| ... | ... |

FACE IMAGE GENERATION DEVICE

TECHNICAL FIELD

One aspect of the present invention relates to a face image generation device.

BACKGROUND ART

A device that acquires a user's face image and generates a post-makeup image acquired by applying makeup to the face image is known. For example, in Patent Document 1, a structure in which a user is allowed to select a situation such as business, shopping, outdoors, a wedding, a funeral, or the like, and a post-makeup image to which makeup according to the selected situation is applied is automatically generated and is presented to a user has been disclosed.

CITATION LIST

Patent Document

[Patent Document 1] Japanese Unexamined Patent Publication No. 2010-17360

SUMMARY OF INVENTION

Technical Problem

In the structure disclosed in Patent Literature 1 described above, by applying makeup prepared in advance for each situation to a face image of a user's face to which makeup has not been applied, a post makeup image is generated. In other words, makeup for each situation is determined in accordance with a uniform reference prepared in advance. For this reason, in the structure described above, features of a user's makeup (for example, a preference, a condition, and the like relating to makeup) are not reflected in a post-makeup image. Meanwhile, for example, when a face image of an avatar defined in a virtual space or the like is generated, there are user's requests for including user's preferences, conditions, and the like in a face image of the avatar.

Thus, an object of one aspect of the present invention is to provide a face image generation device capable of automatically generating a face image in which features of a user's makeup are reflected when the face image to which makeup corresponding to a predetermined pattern is applied is generated.

Solution to Problem

According to one aspect of the present invention, there is provided a face image generation device including: a first face image acquiring unit configured to acquire a first face image to which makeup corresponding to a first pattern has been applied by a user; a feature extracting unit configured to extract features of the makeup of the user on the basis of the first face image and first standard data relating to features of standard makeup corresponding to the first pattern; a second face image generating unit configured to generate a second face image to which makeup corresponding to a second pattern different from the first pattern has been applied by reflecting the features of the makeup of the user extracted by the feature extracting unit in second standard data relating to features of standard makeup corresponding to the second pattern; and a presentation unit configured to present the second face image generated by the second face image generating unit to the user.

According to the face image generation device described above, features of makeup applied by a user for a certain pattern (first pattern) are extracted on the basis of the first face image and first standard data relating to features of the standard makeup corresponding to the first pattern. Then, by reflecting the extracted features of the makeup of the user in the second standard data relating to features of standard makeup corresponding to the second pattern, a second face image to which makeup corresponding to the second pattern is applied is generated. Then, the second face image generated in this way is presented to the user. In other words, according to the face image generation device, makeup is customized for another pattern (second pattern) using makeup of a user corresponding to one certain pattern (first pattern) as a base, and a face image (a second face image) in which the features of the makeup of the user have been reflected can be acquired. Thus, according to the face image generation device, when a face image to which makeup corresponding to a predetermined pattern has been applied is generated, a face image in which features of the makeup of the user have been reflected can be automatically generated.

Advantageous Effects of Invention

According to one aspect of the present invention, a face image generation device capable of automatically generating a face image in which features of a user's makeup are reflected when the face image to which makeup corresponding to a predetermined pattern is applied is generated can be provided.

BRIEF DESCRIPTION OF DRAWINGS

FIG. 2 is a diagram illustrating an example of makeup target portions and parameters.

FIG. 3 is a diagram illustrating an example of a part of standard data.

FIG. 4 is a diagram schematically illustrating an example of a process of a feature extracting unit.

FIG. 5 is a diagram schematically illustrating an example of a process of a second face image generating unit.

DESCRIPTION OF EMBODIMENTS

Hereinafter, an embodiment of the present invention will be described in detail with reference to the attached drawings. In description of the drawings, the same reference signs will be assigned to elements that are the same or correspond to each other, and duplicate description will be omitted.

Figure 1:
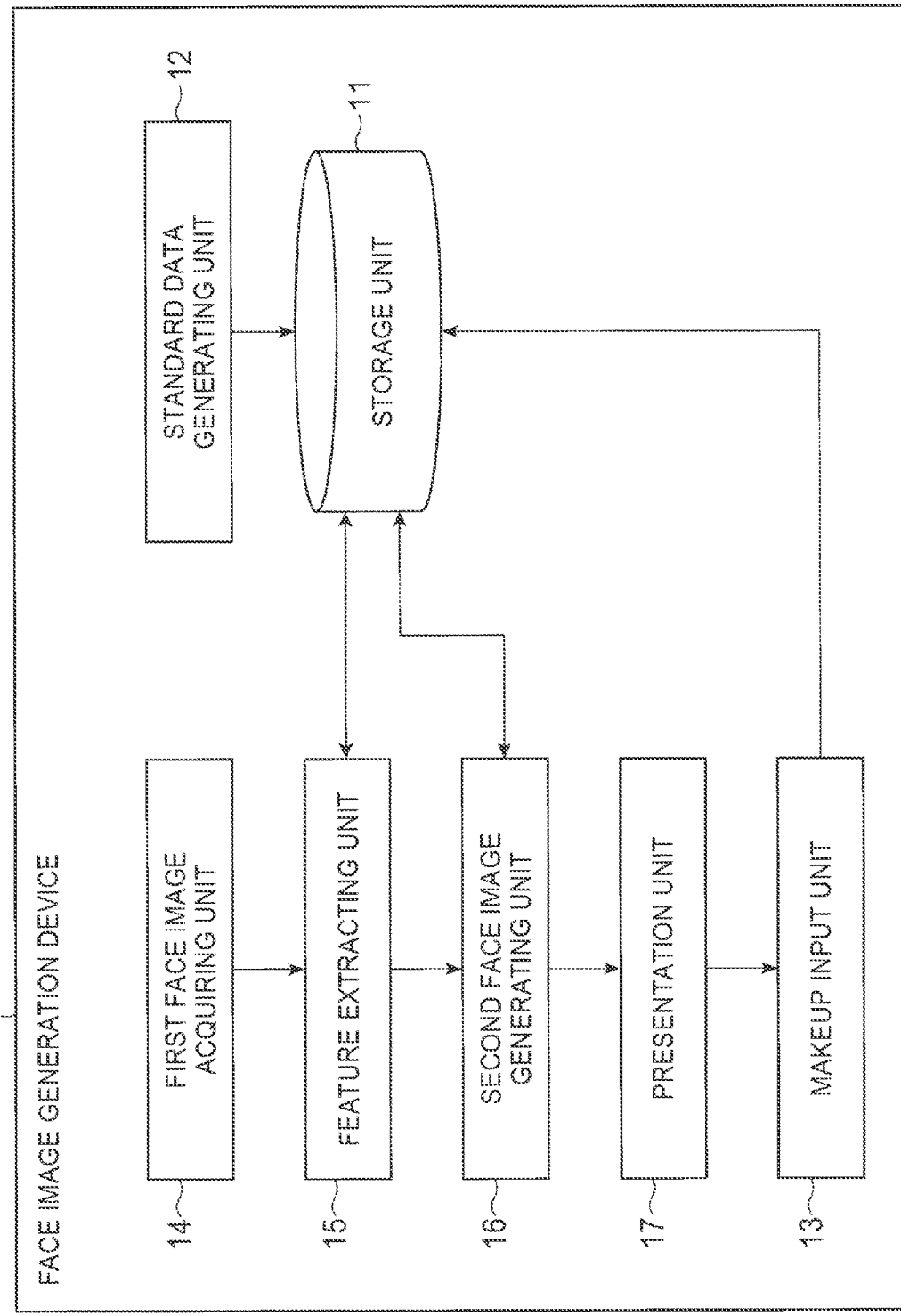
FIG. 1 is a block diagram illustrating a functional configuration of a face image generation device according to an embodiment.

FIG. 1 is a block diagram illustrating a functional configuration of a face image generation device 10 according to an embodiment. As an example, the face image generation device 10 automatically generates a face image that is applied to a user's avatar defined in a virtual space shared among a plurality of users. The "virtual space" represents a virtual two-dimensional or three-dimensional space expressed by an image displayed on a computer. The "avatar" is another self of a user in a virtual space expressed using a computer. The avatar is one type of virtual object defined in a virtual space. The "virtual object" represents an object, which is not actually present in the real world, expressed on a computer system. The avatar (virtual object) may be expressed either two dimensionally or three dimensionally. For example, by providing a content image including a virtual space and virtual objects (including avatars) for a user, the user can experience augmented reality (AR), virtual reality (VR), or mixed reality (MR).

The face image generation device 10 automatically generates a face image (a second face image) of an avatar to which makeup for another use (a second pattern), in which features (for example, preferences, conditions, and the like) of a user's makeup are reflected, is applied on the basis of a face image (a first face image) of an avatar to which makeup for one certain use (a first pattern) is applied by a user. In addition, a type and a configuration of the face image generation device 10 are not particularly limited. For example, the face image generation device 10 may be a portable terminal such as a high function portable telephone (smartphone), a tablet terminal, a wearable terminal (for example, a head mount display (HMD), a smart glass, or the like), a laptop personal computer, a portable telephone, or the like. Alternatively, the face image generation device 10 may be a stationary terminal such as a desktop personal computer or the like. In addition, the face image generation device 10 may be a user terminal held by each user as described above or may be a server apparatus configured to be able to communicate with a user terminal of each user. Alternatively, the face image generation device 10 may be configured using a combination of a user terminal and a server apparatus. In other words, the face image generation device 10 may be configured using a single computer device or may be configured using a plurality of computer devices that are able to communicate with each other.

As illustrated in FIG. 1, the face image generation device 10 includes a storage unit 11, a standard data generating unit 12, a makeup input unit 13, a first face image acquiring unit 14, a feature extracting unit 15, a second face image generating unit 16, and a presentation unit 17.

The storage unit 11 stores various kinds of data used or generated in the face image generation device 10. For example, the storage unit 11 stores standard data for each pattern generated by the standard data generating unit 12, face images of generated avatars (including a face image to which makeup for each pattern has been applied), correction information to be described below, and the like.

The standard data generating unit 12 generates standard data (first standard data and second standard data) corresponding to each of a plurality of patterns prepared in advance. The generated standard data is stored in the storage unit 11. A "pattern" is a classification set in advance on the basis of a use (situation), attributes (for example, sex, age, and the like) of a target to which makeup has been applied, and the like. Examples of the use include going-out (shopping or the like), school commuting, working, dating, a wedding, a funeral, and the like. However, the pattern is not limited to the classification described above, and a classification based on various points of view can be used as the pattern. For example, the pattern may include classifications such as climate (air temperature, weather, or the like), a time period (for example, a season or the like), and the like.

Standard data corresponding to a certain pattern is data relating to features of a makeup of a face image to which standard makeup (makeup serving as a reference) corresponding to this pattern is applied. In this embodiment, standard data corresponding to each pattern includes information relating to a distribution set in advance for standard makeup corresponding to each pattern (for example, information such as an average, a dispersion, or the like). Here, the distribution described above may be arbitrarily set by a service provider or may be set on the basis of a statistical analysis result of a plurality of face images (samples) to which makeup corresponding to each pattern is applied. As an example, the standard data corresponding to each pattern includes information relating to a distribution of features of makeup using a face of a standard size set in advance as a reference. In addition, information relating to a distribution of features of makeup included in the standard data corresponding to each pattern includes an average and a dispersion of parameters relating to makeup of one or more makeup target portions set in advance. One or more parameters are associated with each makeup target portion, and an average and a dispersion are set for each parameter.

FIG. 2 is a diagram illustrating an example of makeup target portions and parameters. As illustrated in FIG. 2, the makeup target portions are portions (parts) that can be targets to which a makeup is applied. Here, as an example, a mascara, an eye shadow, an eyebrow, a lip (lipstick), face powder (makeup powder), a makeup base, a foundation, a cheek, and an eyeliner are set as makeup target portions. In addition, one or more parameters are set for each makeup target portion. For example, parameters are information representing attributes that can be expressed using numerical values among features of makeup for a makeup target portion. In this example, for the makeup target portion of "mascara", four parameters of a length, a thickness, a depth, and a position are set. Similarly, also for any of other makeup target portions, one or a plurality of parameters are set.

FIG. 3 is a diagram illustrating an example of a part of standard data. (A) of FIG. 3 illustrates an example of partial data (each parameter value of the makeup target portion of "eyebrow") of standard data corresponding to a pattern of the use of "going-out time" and the attribute of "female in the 10's" (that is, a pattern corresponding to "the going-out time of female in the 10's"). This data includes information representing that an average of the parameter "length" of the makeup target portion "eyebrow" relating to the pattern described above is 5 cm, and the dispersion thereof is 1.0 cm. Similarly, this data includes information representing averages and dispersions of the parameters "position" and "thickness" of the makeup target portion "eyebrow" relating to the pattern described above. In addition, the parameter "position" represents position coordinates of the center of gravity of a left (or right) eyebrow in XY coordinates (an X-axis direction is a horizontal direction, and a Y-axis direction is a vertical direction) having the center of a face as its origin point (0, 0). In a case in which the face image of the avatar is three-dimensionally expressed, the parameter "position" may be expressed using XYZ coordinates including a Z-axis direction (a depth direction). In this embodiment, for simplification of description, the description will be presented using XY coordinates. (B) of FIG. 3 illustrates an example of partial data (each parameter value of the makeup target portion "eyebrow") of standard data corresponding to a pattern different from the pattern illustrated in (A) of FIG. 3 (that is, a pattern corresponding to "a school commuting time of a female in 10's). In the example illustrated in FIG. 3, as a makeup of a standard eyebrow corresponding to the school commuting time, a makeup that is thinner than that of the going-out time (that is, an eyebrow that is shorter and finer than that of the going-out time).

The standard data generating unit 12, for example, generates standard data for each pattern as illustrated in FIG. 3 (data including an average and a dispersion of each parameter of each makeup target portion) using the following method.

(First Example of Standard Data Generating Process)

The standard data generating unit 12 may generate an avatar corresponding to each of a plurality of face images (photographed images) to which makeups in the real world have been applied and generate standard data for each pattern on the basis of features of makeups of a plurality of avatars that have been generated. For example, the standard data generating unit 12 can generate avatars from the photographed image described above using a known technique. For example, by performing image processing (an image analysis) of the photographed image described above, the standard data generating unit 12 extracts a specific makeup target portion (for example, an eyebrow) in a face image and extracts features (for example, a length, a thickness, a depth, a position, and the like) of the extracted makeup target portion. Then, the standard data generating unit 12 performs such a feature extracting process for all the makeup target portions set in advance and generates an avatar in which extracted features of each of the makeup target portion are reflected.

In addition, the standard data generating unit 12 may acquire information relating to a pattern (for example, a pattern of "for the use at a going-out time of a female in 10's) of a makeup of the photographed image described above and associate this pattern with the generated avatar. Information of the pattern of such a makeup, for example, may be registered in advance by an owner of the photographed image. Alternatively, a person who has acquired the photographed image may register a pattern reasoned analogically from a photographing time period, a landscape, and the like of the photographed image. In accordance with the process described above, the standard data generating unit 12 can collect a plurality of avatars to which a makeup in the real world is applied for each pattern (that is, avatars generated on the basis of a face image to which a makeup in the real world is applied).

Subsequently, the standard data generating unit 12 may generate standard data for each pattern on the basis of a plurality of avatars collected for each pattern. For example, the standard data generating unit 12 may calculate each parameter value (an average and a dispersion) of each makeup target portion by collecting features (that is, parameter values) of each makeup target portion of each face image after converting each of face images of a plurality of avatars collected for each pattern into a standard size set in advance. In accordance with such a process, for each combination of a pattern and a makeup target portion, standard data as illustrated in FIG. 3 can be acquired.

According to the first example described above, appropriate standard data (a reference of a makeup) can be generated on the basis of an actual example of a makeup in the real world.

(Second Example of Standard Data Generating Process)

The standard data generating unit 12 may generate standard data for each pattern on the basis of features of makeups of a plurality of avatars generated by a plurality of users in a virtual space. For example, the standard data generating unit 12 acquires an avatar to which a makeup selected by a user is applied in a virtual space as a sample. As an example of the avatar described above, there is an avatar acquired by applying a makeup to a face image of an avatar generated on the basis of a face image of a natural face of a user using the makeup input unit 13 to be described below. Subsequently, similar to the first example, the standard data generating unit 12 may generate standard data for each pattern on the basis of a plurality of avatars (samples) collected for each pattern.

A makeup preferred in the real world and a makeup preferred in a virtual space do not necessarily coincide with each other. According to the second example described above, standard data in which a trend of a makeup of an avatar in a virtual space is reflected can be generated. In addition, in the second example described above, the standard data generating unit 12, for each predetermined period (for example, four quarters, one year, or the like), may update standard data of each pattern on the basis of makeups of a plurality of avatars generated by a plurality of users within the predetermined period described above. According to the configuration described above, standard data corresponding to a change of a trend (popularity) of a user's makeup in a virtual space can be prepared.

(Third Example of Standard Data Generating Process)

The standard data generating unit 12, for example, may generate standard data for each pattern by receiving a manual operation using a service provider or the like. For example, by a knowledgeable person having detailed knowledge about a general makeup or a person who has obtained knowledge from this knowledgeable person manually inputting (setting) each of parameter values (an average and a dispersion) of each makeup target portion in each pattern, standard data for each pattern may be generated. According to the configuration described above, when there is a change in the trend of a user's makeup or the like, the standard data can be updated timely and flexibly.

(Another Example of Standard Data Generating Process)

The standard data generating unit 12 may generate standard data in units of regions (divisions such as countries, districts, and the like). In other words, the standard data generating unit 12 may generate standard data for a user belonging to a certain region only on the basis of a makeup of an avatar of a user belonging to this region. According to the configuration described above, standard data in which the trend of a makeup for each region is reflected can be prepared. In addition, the standard data generating unit 12 may generate standard data on the basis of features of a makeup recommended by an industry such as a makeup company, an apparel company, and the like leading a trend of makeups. Furthermore, the standard data generating unit 12 may generate standard data on the basis of features of makeups of a specific entertainer, a specific model, and the like.

The makeup input unit 13 provides a user interface for applying a makeup to an avatar for a user. For example, the makeup input unit 13 displays a face image of the avatar on a display of the face image generation device 10 (for example, in a case in which the face image generation device 10 is a smartphone, a tablet terminal, or the like, a touch panel display). In addition, the makeup input unit 13 causes a plurality of icons representing various makeup tools such as a brush and the like to be displayed on the display and allows a user to select a makeup tool and select an area to which a makeup according to this makeup tool is applied in the face image of the avatar. Then, the makeup input unit 13 applies the makeup according to the makeup tool selected by the user to the area selected by the user. For example, the makeup input unit 13 may determine a state (for example, a depth or the like) of the makeup in accordance with a pressure, the number of times, a touch time (a time in which a touch is continued), and the like of a user's touch operation on a touch panel display. In this case, the user can apply a makeup to the avatar with a feeling as in a makeup in the real world. In addition, the makeup input unit 13 receives an input of a corresponding pattern (for example, "a school commuting time of a female in 10's" or the like) from a user. The makeup input unit 13 stores a face image of the avatar to which the makeup described above is applied in the storage unit 11 as a face image of the avatar to which a makeup corresponding to the input pattern is applied.

The first face image acquiring unit 14 acquires a first face image to which a makeup corresponding to a first pattern has been applied by a user. For example, the first pattern is one pattern that is arbitrarily selected by a user among a plurality of patterns set in advance. In the following description, as an example, it is assumed that the user is "a female in 10's", and "a going-out time of a female in 10's" has been selected as a first pattern.

(First example of acquisition of first face image)

The first face image acquiring unit 14 may acquire a face image (a face image to which a makeup corresponding to a first pattern has been applied) of an avatar generated in the process of the makeup input unit 13 described above as a first face image. In other words, the first face image acquiring unit 14 may acquire a face image of an avatar to which a makeup using a user interface provided by the makeup input unit 13 has been applied as a first face image.

(Second Example of Acquisition of First Face Image)

The first face image acquiring unit 14 may acquire a captured user's face image (a photograph or the like) after a user applies a makeup for the use at the time of going out to his or her face in the real world. Then, by performing a known conversion process as described above in "the first example of the standard data generating process" for a face image of this user, the first face image acquiring unit 14 may acquire a face image of an avatar corresponding to the face image of this user. The first face image acquiring unit 14 may acquire the face image of the avatar acquired in this way as a first face image.

(Third Example of Acquisition of First Face Image)

In the second example of the acquisition described above, there may be cases in which noise due to resolution, a gloss, and the like of a face image (photograph) of a user is generated, and a face image of an avatar according to user's intention is not generated. In such cases, the user may correct the makeup for the face image of the avatar using a user interface provided by the makeup input unit 13. In other words, the first face image acquiring unit 14 may acquire a face image acquired by applying a makeup using the makeup input unit 13 to the face image of the avatar acquired in the second example of the acquisition described above as a first face image.

The feature extracting unit 15 extracts features of the makeup of the user on the basis of the first face image acquired by the first face image acquiring unit 14 and first standard data that is standard data corresponding to the first pattern. An example of the process of the feature extracting unit 15 will be described with reference to FIG. 4. FIG. 4 is a diagram schematically illustrating an example of the process of the feature extracting unit 15. FIG. 4 illustrates an example of a first face image (a first face image 21), an example of a first converted face image (a first converted face image 22) to be described below, and an example of first standard data (here, only data corresponding to the makeup target portion "eyebrow") (first standard data 23).

The feature extracting unit 15 generates a first converted face image 22 of a standard size by converting the first face image 21 using a conversion rate according to the first face image 21. "The conversion rate according to the first face image" is a conversion rate for converting a size of the first face image into a standard size set in advance as a reference of standard data. Such a conversion rate can be calculated by comparing an actual size of the first face image with the standard size. "The size of a face image", for example, in a case in which the face image is two-dimensionally expressed, is defined by a vertical length and a horizontal length, and, in a case in which the face image is three-dimensionally expressed, the size is defined by a vertical length, a horizontal length, and a depth length. For example, in a case in which a face image is three dimensionally expressed, a conversion rate (an enlargement rate or a reduction rate) of each of the vertical length, the horizontal length, and the depth length is calculated. By converting a measure of each of the vertical length, the horizontal length, and the depth length using each conversion rate, the feature extracting unit 15 converts the size of the first face image into the standard size. At this time, the feature extracting unit 15 changes not only the size of the face but also the size of each makeup target portion (that is, each part included in the face image) in accordance with the conversion rates described above.

In the example illustrated in FIG. 4, in the first converted face image 22, a length of the eyebrow is "5.5 cm", a position of the eyebrow (coordinates with reference to an origin point of the center of gravity (the center) of the eyebrow (face center)) is (2 cm, 11 cm), and a thickness of the eyebrow is "1 cm".

Subsequently, by comparing the first converted face image 22 with the first standard data 23, the feature extracting unit 15 extracts features of a makeup of a user. For example, for each makeup target portion, the feature extracting unit 15 extracts a deviation degree representing a degree of deviation of the first converted face image 22 from the first standard data 23 as a feature of the makeup of the user. The feature extracting unit 15 calculates the deviation degree described above on the basis of the value of each parameter in the first converted face image 22 and an average and a dispersion of each parameter in the first standard data 23. FIG. 4 illustrates an example of the process of the feature extracting unit 15 for the makeup target portion "eyebrow".

In this example, for the parameter "length", a length of "5.5 cm" of the eyebrow in the first converted face image 22 is larger than an average of "5 cm" of the length of the eyebrow in the first standard data 23 by 0.5 cm. Since a dispersion σ of the length of the eyebrow in the first standard data 23 is "1.0 cm", it can be understood that the length of the eyebrow in the first converted face image 22 is larger than the average of the length of the eyebrow in the first standard data 23 by "0.5σ". Thus, the feature extracting unit 15 acquires "+0.5σ" (that is, information representing that it is larger than the standard value by 0.50) as the deviation degree for the parameter "length"

In addition, for the parameter "position", a position (2 cm, 11 cm) of the eyebrow in the first converted face image 22 is larger than an average (2 cm, 10 cm) of positions of the eyebrow in the first standard data 23 by 1.0 cm in a height direction. Since the dispersion σ of the position of the eyebrow in the first standard data 23 is "0.5 cm", it can be understood that the position of the eyebrow in the first converted face image 22 is larger than the average of position of the eyebrow in the first standard data 23 by "2σ" in the height direction. Thus, the feature extracting unit 15 acquires "+2σ in the height direction" (that is, information representing that it is larger by 2σ in the height direction) as the deviation degree for the parameter "position".

On the other hand, for the parameter "thickness", a thickness of "1 cm" of the eyebrow in the first converted face image 22 coincides with a thickness of "1 cm" of the eyebrow in the first standard data 23. Thus, the feature extracting unit 15 acquires "+0σ" (that is, information representing being the same) as the deviation degree of for the parameter "thickness"

In accordance with the process described above, the feature extracting unit 15 can calculate the deviation degree of each parameter for the makeup target portion "eyebrow". By performing the process as described above also for makeup target portions other than the eyebrow, the feature extracting unit 15 can calculate the deviation degree of each parameter for each makeup target portion. The deviation degree of each parameter for each makeup target portion acquired in this way is information representing a degree of difference from a standard makeup and, in other words, may be regarded as information representing user's preferences, conditions, and the like with respect to a standard makeup. Thus, the feature extracting unit 15 extracts the deviation degree of each parameter for each makeup target portion acquired in this way as features of the makeup of the user. The features of the makeup of the user (that is, a degree of deviation of each parameter for each makeup target portion) extracted by the feature extracting unit 15 are stored in the storage unit 11.

By reflecting the features of the makeup of the user extracted by the feature extracting unit 15 in second standard data that is standard data corresponding to a second pattern different from the first pattern, the second face image generating unit 16 generates a second face image to which a makeup corresponding to the second pattern is applied. The second pattern, for example, may be arbitrarily selected by a user. Only one second pattern may be selected from among a plurality of patterns set in advance, or a plurality of second patterns may be selected. In addition, all the patterns other than the first pattern among a plurality of patterns set in advance may be selected as second patterns. In the following description, by focusing on one certain second pattern, the process of the second face image generating unit 16 will be described. In the following description, as one example, it is assumed that "school commuting time of a female in 10's" is selected as the second pattern. In addition, in a case in which a plurality of second patterns are selected, processes described below may be performed for each of the second patterns.

Referring to FIG. 5, an example of the process of the second face image generating unit 16 will be described. FIG. 5 is a diagram schematically illustrating an example of the process of the second face image generating unit 16. FIG. 5 illustrates an example (second standard data 24) of second standard data (here, only data corresponding to the makeup target portion "eyebrow"), an example (a second converted face image 25) of a second converted face image to be described below, and an example (a second face image 26) of a second face image.

By reflecting the features of the makeup of the user extracted by the feature extracting unit 15 in the second standard data 24, the second face image generating unit 16 generates a second converted face image 25 of a standard size. For example, the second face image generating unit 16, for each makeup target portion, calculates a correction value on the basis of the features (deviation degree) of the makeup of the user extracted by the feature extracting unit 15 and a dispersion of parameters in the second standard data 24. By correcting an average of parameters in the second standard data using this correction value, the second face image generating unit 16 determines values of the parameters in the second converted face image 25.

An average of the parameter "length" of the eyebrow in the second standard data 24 is "4.5 cm", and a dispersion σ thereof is "0.8 cm". On the other hand, a feature (deviation degree) of the makeup of the user of the parameter "length" of the eyebrow is "+0.5σ" (see FIG. 4). In this case, the second face image generating unit 16 calculates a correction value "0.4 cm (=0.8 cm×0.5)" on the basis of the dispersion σ of "0.8 cm" of the parameter "length" in the second standard data 24 and the deviation degree of "+0.5σ". By adding this correction value to an average of the parameter "length" in the second standard data 24, the second face image generating unit 16 determines a value "4.9 cm (=4.5 cm+0.4 cm)" of the parameter "length" in the second converted face image 25.

An average of the parameter "position" of the eyebrow in the second standard data 24 is (2 cm, 10 cm), and a dispersion σ thereof is "0.5 cm". On the other hand, a feature (deviation degree) of the makeup of the user of the parameter "position" of the eyebrow is "+2σ in the height direction" (see FIG. 4). In this case, the second face image generating unit 16 calculates a correction value of "+1.0 cm (=0.5 cm×2) in the height direction" on the basis of the dispersion σ of "0.5" of the parameter "position" in the second standard data 24 and the deviation degree of "+2σ in the height direction". By adding this correction value to the average of the parameter "position" in the second standard data 24, the second face image generating unit 16 determines a value of "11 cm" of the height of the parameter "position" in the second converted face image 25. As a result, the parameter "position" in the second converted face image 25 is determined to be (2 cm, 11 cm).

A feature (deviation degree) of the makeup of the user of the parameter "thickness" of the eyebrow is "10G" (see FIG. 4). For this reason, the second face image generating unit 16 determines the average of "0.8" of the parameter "thickness" of the eyebrow in the second standard data 24 to be a value of the parameter "thickness" in the second converted face image 25 as it is.

In accordance with the processes described above, the second face image generating unit 16 can determine a value of each parameter for the makeup target portion "eyebrow" in the second converted face image 25. By performing a process similar to that described above for makeup target portions other than the eyebrow in the second converted face image 25, the second face image generating unit 16 can determine a value of each parameter for each makeup target portion in the second converted face image 25.

Subsequently, by performing a reverse conversion of the second converted face image 25 using the conversion rate described above (that is, the conversion rate used when the feature extracting unit 15 converts the first face image 21 into the first converted face image 22), the second face image generating unit 16 generates a second face image 26 of a size corresponding to the first face image 21. In accordance with the processes described above, a face image (the second face image 26) to which a makeup corresponding to the second pattern has been applied and in which features of the makeup of the user have been reflected can be acquired.

The presentation unit 17 presents the second face image 26 generated by the second face image generating unit 16 to a user. For example, in a case in which the face image generation device 10 is a user terminal such as a smartphone or the like held by a user, the presentation unit 17 may present the second face image 26 to the user by displaying the second face image 26 to an output device such as a display or the like included in this user terminal. Alternatively, in a case in which the face image generation device 10 is a device different from a user terminal (for example, a server apparatus configured to be able to communicate with the user terminal), the presentation unit 17 may present the second face image 26 to the user by transmitting display data of the second face image 26 to this user terminal and causing the second face image 26 to be displayed in this user terminal.

Next, operations of the face image generation device 10 (including a face image generation method according to one embodiment) will be described with reference to the examples illustrated in FIGS. 4 and 5 and a flowchart illustrated in FIG. 6.

In Step S1, the standard data generating unit 12 generates standard data for each of a plurality of patterns set in advance. The generated standard data is stored in the storage unit 11.

In Step S2, the first face image acquiring unit 14 acquires a first face image 21 to which a makeup corresponding to the first pattern (in the example illustrated in FIG. 4, "a going-out time of a female in 10's") has been applied by a user.

In Step S3, the feature extracting unit 15 extracts features of the makeup of the user on the basis of the first face image 21 acquired in Step S2 and the first standard data 23 that is standard data corresponding to the first pattern. Details of the process of Step S3 will be described with reference to a flowchart illustrated in FIG. 7.

In Step S31, by converting the first face image 21 using a conversion rate according to the first face image 21, the feature extracting unit 15 generates a first converted face image 22 of a standard size.

In Step S32, the feature extracting unit 15 selects one makeup target portion that is a processing target. As an example, the feature extracting unit 15 selects an "eyebrow" as a makeup target portion that is a processing target.

In Step S33, the feature extracting unit 15 selects one parameter included in the selected makeup target portion "eyebrow". As one example, the makeup target portion "eyebrow" includes three parameters including a length, a position, and a thickness, and the feature extracting unit 15 selects "length".

In Step S34, the feature extracting unit 15 acquires a value of the parameter "length" of the first converted face image 22 (in the example illustrated in FIG. 4, "5.5 cm").

In Step S35, the feature extracting unit 15 acquires an average and a dispersion of the parameter "length" in the first standard data (in the example illustrated in FIG. 4, "5 cm" and "1.0 cm").

In Step S36, the feature extracting unit 15 calculates the deviation degree of the selected parameter "length" on the basis of the information acquired in Steps S34 and S35. In the example illustrated in FIG. 4, the length of the eyebrow in the first converted face image 22 is larger than the average of length of the eyebrow in the first standard data 23 by "0.5σ", and thus the feature extracting unit 15 acquires "−0.5σ" as the deviation degree for the parameter "length".

The feature extracting unit 15 repeats the processes of Steps S33 to S36 until the processes are completed for all the parameters included in the makeup target portion that is a processing target (the makeup target portion "eyebrow" selected in Step S32) (Step S37: No).

When the processes are completed for all the parameters (here, a length, a position, and a thickness) included in the makeup target portion "eyebrow", and the deviation degrees of all the parameters are acquired (Step S37: Yes), the feature extracting unit 15 repeats the processes of Steps S32 to S37 until the processes are completed for all the makeup target portions (Step S38: No). For example, in a case in which 9 makeup target portions illustrated in FIG. 2 are defined, the feature extracting unit 15 performs the processes of Steps S33 to S37 for each of such 9 makeup target portions. At a time point at which the processes are completed for all the makeup target portions (Step S38: Yes), the process of the feature extracting unit 15 (Step S3 illustrated in FIG. 6) is completed.

Figure 8:
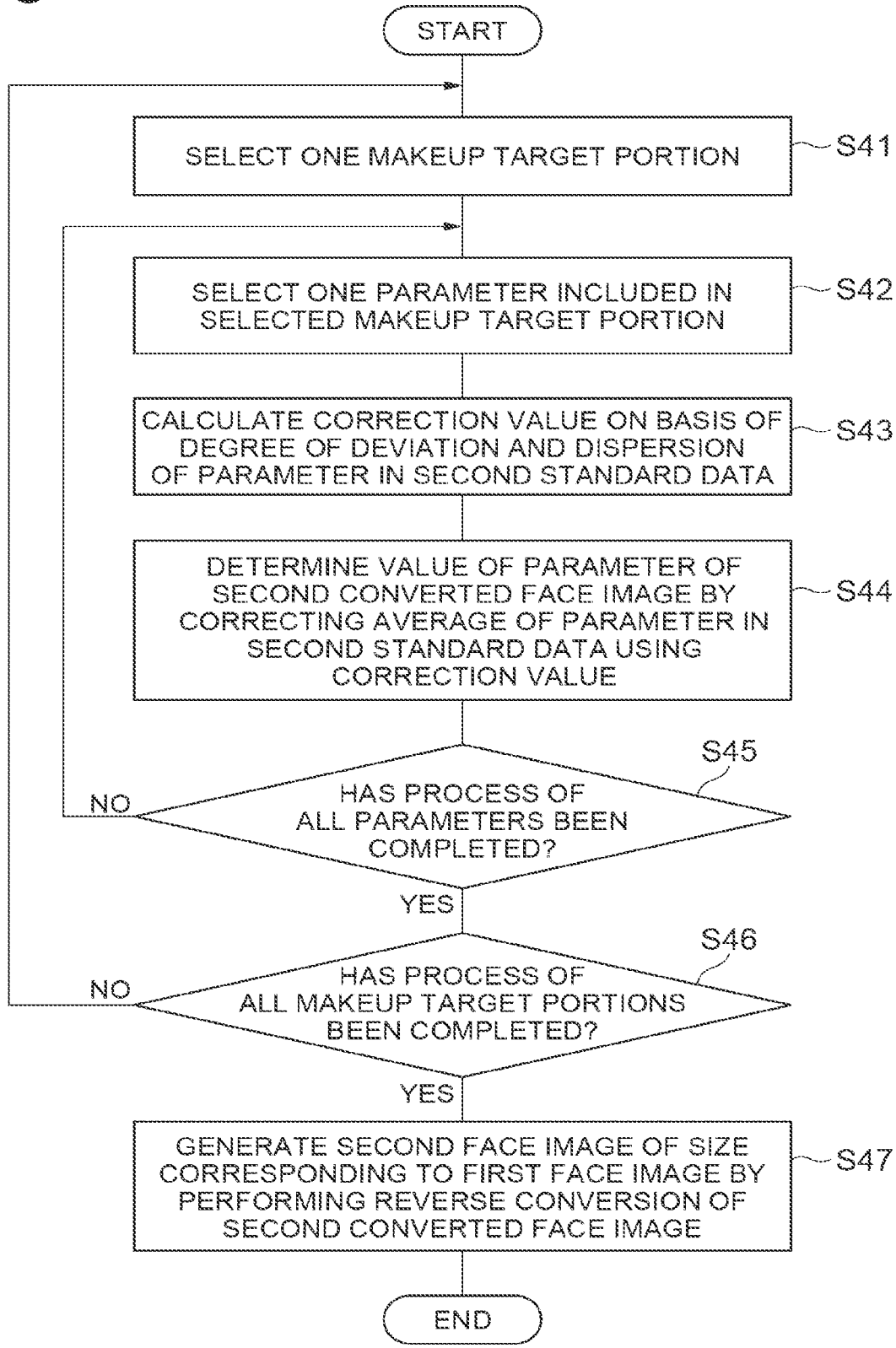
FIG. 8 is a flowchart illustrating an example of a processing sequence of Step S4 represented in FIG. 6.

Referring back to FIG. 6, in Step S4, by reflecting features of a makeup of the user (that is, the deviation degree for each parameter of each makeup target portion) extracted in Step S3 in the second standard data 24 corresponding to a second pattern (a school commuting time of a female in 10's in the example illustrated in FIG. 5) different from the first pattern, the second face image generating unit 16 generates a second face image 26 to which the makeup corresponding to the second pattern has been applied. Details of the process of Step S4 will be described with reference to a flowchart illustrated in FIG. 8.

In Step S41, the second face image generating unit 16 selects one makeup target portion of a processing target. As one example, the second face image generating unit 16 selects "eyebrow" as a makeup target portion of the processing target.

In Step S42, the second face image generating unit 16 selects one parameter included in the selected makeup target portion "eyebrow". As one example, the second face image generating unit 16 selects "length".

In Step S43, the second face image generating unit 16, for the selected parameter "length" of the selected makeup target portion "eyebrow", calculates a correction value on the basis of the feature (the deviation degree) of the makeup of the user extracted in Step S3 (see FIG. 6) and the dispersion σ of the parameter "length" in the second standard data 24. In the example illustrated in FIG. 5, the second face image generating unit 16 calculates a correction value of "0.4 cm".

In Step S44, by correcting the average of the parameter "length" in the second standard data 24 using the correction value calculated in Step S43, the second face image generating unit 16 determines a value of the parameter "length" of the second converted face image 25. In this example, the parameter "length" of the second converted face image 25 is determined to be a value of "4.9 cm" acquired by adding the correction value "0.4 cm" to the average "4.5 cm" of the parameter "length" in the second standard data 24.

The second face image generating unit 16 repeats the processes of Steps S42 to S44 until the processes are completed for all the parameters included in the makeup target portion (the makeup target portion "eyebrow" selected in Step S41) that is a processing target (Step S45: No).

When the processes are completed for all the parameters (here, the length, the position, and the thickness) included in the makeup target portion "eyebrow", and values of all the parameters of the makeup target portion "eyebrow" in the second converted face image 25 are determined (Step S45: Yes), the second face image generating unit 16 repeats the processes of Steps S41 to S45 until the processes are completed for all the makeup target portions (Step S46: No). At a time point at which the processes are completed for all the makeup target portions (Step S46: Yes), the second converted face image 25 is determined.

Figure 6:
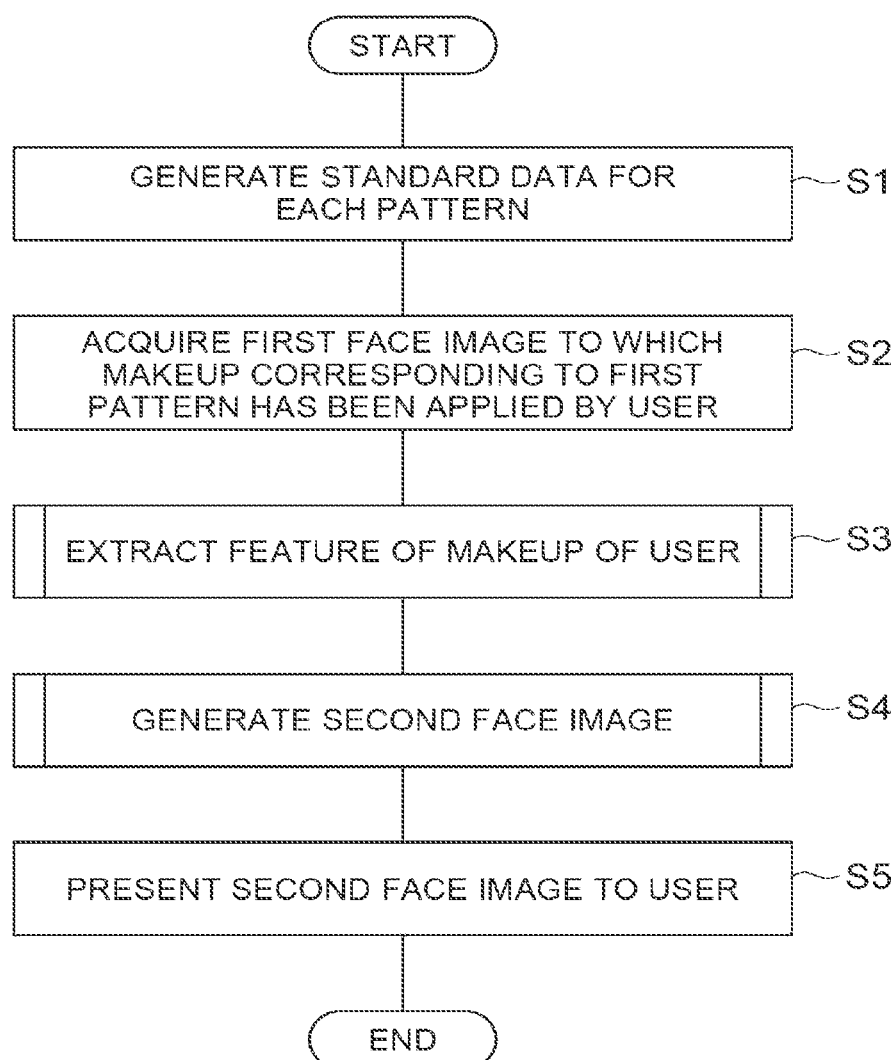
FIG. 6 is a flowchart illustrating an example of operations of a face image generation device.
Figure 7:
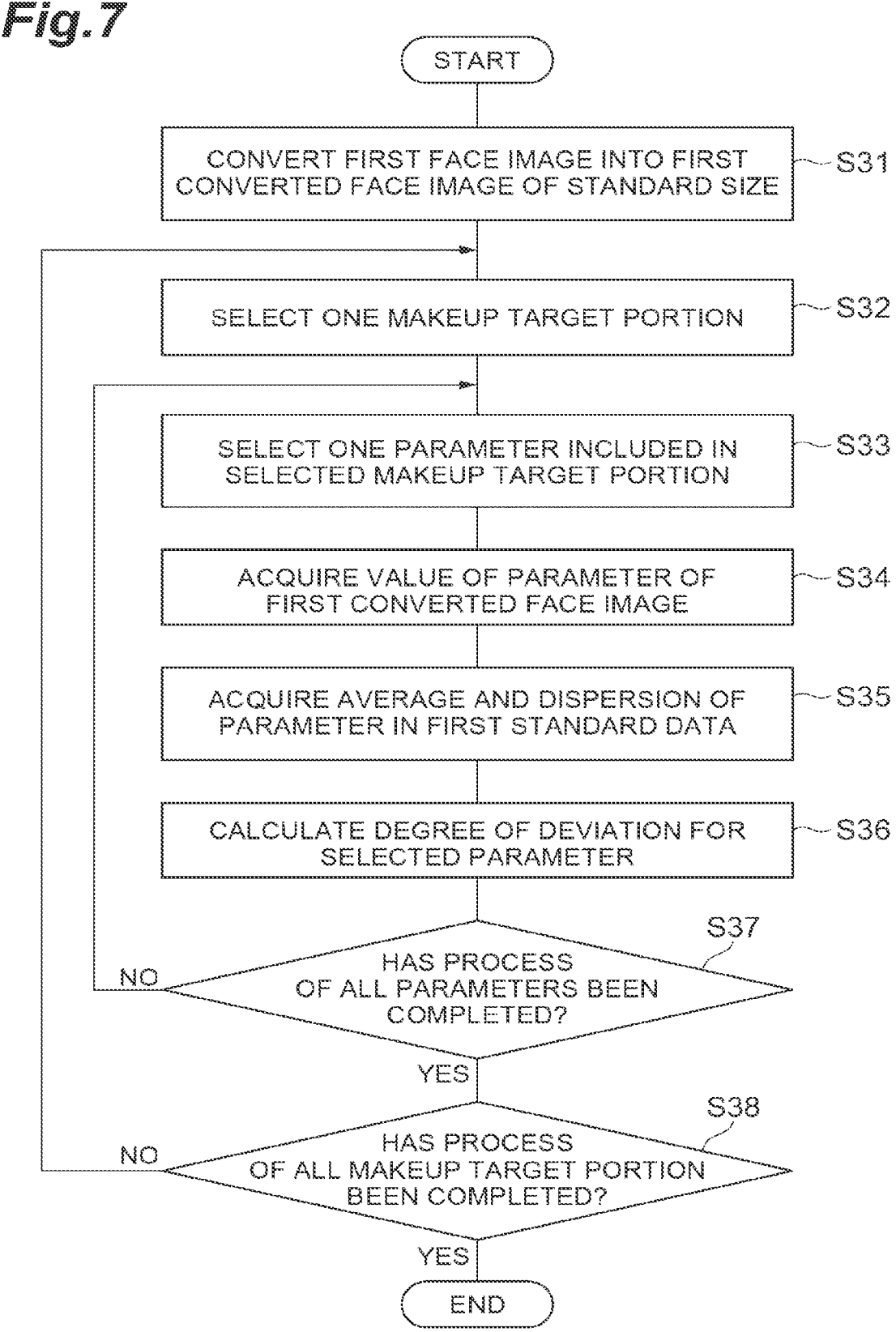
FIG. 7 is a flowchart illustrating an example of a processing sequence of Step S3 represented in FIG. 6.

In Step S47, by performing reverse conversion of the second converted face image 25 using the conversion rate (that is, the conversion rate used in Step S31 illustrated in FIG. 7) described above, the second face image generating unit 16 generates a second face image 26 of a size corresponding to the first face image 21. In accordance with the processes described above, the process (Step S4 illustrated in FIG. 6) of the second face image generating unit 16 is completed. In other words, a face image (the second face image 26) to which a makeup corresponding to the second pattern has been applied and in which the feature of the makeup of the user has been reflected can be acquired.

Referring back to FIG. 6, in Step S5, the presentation unit 17 presents the second face image 26 generated by the second face image generating unit 16 to the user. In addition, in a case in which a plurality of second face images corresponding to a plurality of second patterns are generated (for example, in a case in which a plurality of second patterns are designated by the user, a case in which all the patterns other than the first pattern among a plurality of patterns set in advance are set as second patterns, or the like), the second face image generating unit 16 may individually perform the process of Step S4 for each of the plurality of second patterns. In addition, in Step S5, the presentation unit 17 may present a plurality of second face images 26 (a list of face images of respective patterns) corresponding to the plurality of second patterns to the user.

According to the face image generation device 10 described above, for a certain pattern (a first pattern, for example, "a going-out time of a female in 10's), features of a makeup applied by a user are extracted on the basis of the first face image 21 (see FIG. 4) and the first standard data 23 (see FIG. 4). Then, by reflecting the extracted features of the makeup of the user in the second standard data 24 (see FIG. 5) corresponding to the second pattern (for example, "a school commuting time of a female in 10's"), a second face image 26 (see FIG. 5) to which the makeup corresponding to the second pattern has been applied is generated. Then, the second face image 26 generated in this way is presented to the user. In other words, according to the face image generation device 10, a makeup is customized for another pattern (second pattern) using a makeup of a user corresponding to one certain pattern (first pattern) as a base, and a face image (a second face image 26) in which the features of the makeup of the user have been reflected can be acquired. Thus, according to the face image generation device 10, when a face image to which a makeup corresponding to a predetermined pattern has been applied is generated, a face image in which features of the makeup of the user have been reflected can be automatically generated.

By using the face image generation device 10, a user does not need to individually generate a makeup of an avatar for each of a plurality of patterns set in advance. In other words, by only generating a makeup of an avatar for a one arbitrary pattern, a user can cause the face image generation device 10 to automatically generate a makeup of an avatar for another pattern (a makeup in which features of a makeup of the user are reflected). As a result, user's effort is dramatically reduced. In addition, a makeup generated by a user for one pattern (in other words, a makeup in which user's preferences and conditions are reflected) can be reflected not only in this one pattern but also in a makeup of another pattern, and thus convenience and satisfaction of the user can be improved.

Furthermore, standard data prepared for each pattern includes information relating to a distribution of features of a makeup with reference to a face of a standard size set in advance. By converting the first face image 21 using a conversion rate according to the first face image 21, the feature extracting unit 15 generates a first converted face image 22 of a standard size. By comparing the first converted face image 22 with the first standard data 23, the feature extracting unit 15 extracts features of the makeup of the user. By reflecting features of the makeup of the user in the second standard data 24, the second face image generating unit 16 generates a second converted face image 25 of a standard size. By performing reverse conversion of the second converted face image 25 using the conversion rate described above, the second face image generating unit 16 generates a second face image 26 of a size corresponding to the first face image 21. According to the configuration described above, after the size of a face image (the first face image 21) generated by the user and the size (standard size) of a face image defined as standard data are caused to match each other, features of the makeup of the user are extracted. Thus, the features of the makeup of the user can be extracted with high accuracy.

In addition, the information relating to a distribution of features of a makeup included in standard data prepared for each pattern includes averages and dispersions of parameters relating to makeups of one or more makeup target portions set in advance. The feature extracting unit 15 extracts a deviation degree representing a degree of deviation of the first converted face image 22 from the first standard data 23 as a feature of the makeup of the user on the basis of values of parameters in the first converted face image 22 and averages and dispersions of the parameters in the first standard data 23 for each makeup target portion. For each makeup target portion, the second face image generating unit 16 determines a value of the parameter in the second converted face image 25 by calculating a correction value on the basis of the deviation degree and the dispersion of the parameter in the second standard data 24 and correcting the average of the parameter in the second standard data 24 using the correction value. According to the configuration described above, an appropriate correction value can be acquired on the basis of an average and a dispersion of the parameter for each pattern. As a result, a second face image can be acquired for each pattern. For example, a difference (in this case, 0.5 cm) between a value of the parameter in the first converted face image 22 (for example, a value of "5.5 cm" of "length") and an average of the parameter in the first standard data 23 (for example, an average of "5 cm" of "length") may be simply used as a common correction value for all the patterns (second patterns). However, in a case in which such a fixed value is employed as a correction value, problems as below may occur. For example, there may be a case in which, for a certain parameter, a difference between the average of the parameter in the first pattern and the average of the parameter in the second pattern is large, and the scale of the dispersion of the parameter is relatively largely different between the first pattern and the second pattern. In this way, in a case in which a difference in scale between parameter values of the first pattern and the second pattern is large, when a difference between parameter values in the first pattern as described above (a difference from the average of the first standard data) is used as a correction value of the second pattern as it is, there is concern that the balance of a makeup applied to the second face image 26 collapses. On the other hand, according to the face image generation device 10 described above, by using a correction value with reference to the dispersion σ, the difference in scale described above can be absorbed, and the problem as described above can be avoided.

(First Modified Example of Process of Face Image Generation Device)

In a first modified example, the first face image acquiring unit 14 acquires a plurality of first face images corresponding to a first pattern. In addition, the feature extracting unit 15 extracts features (for example, the deviation degree for each parameter described above) of the makeup of the user for each first face image. Furthermore, the second face image generating unit 16 generates a plurality of second face images corresponding to a plurality of first face images on the basis of features of the makeup of the user for each first face image extracted by the feature extracting unit 15. In addition, the presentation unit 17 presents the plurality of second face images generated by the second face image generating unit 16 to the user.

The process of the first modified example will be described with reference to a flowchart illustrated in FIG. 9.

The process of Step S101 is similar to the process of Step S1 illustrated in FIG. 6.

In Step S102, the first face image acquiring unit 14 acquires a plurality of first face images corresponding to a first pattern. For example, the first face image acquiring unit 14 acquires a plurality of mutually-different first face images corresponding to a pattern of "going-out time of a female in 10's" (a first pattern).

In Step S103, by performing a process similar to that of Step S3 illustrated in FIG. 6 for each first face image, the feature extracting unit 15 extracts a feature (a deviation degree for each parameter) of a makeup of the user for each first face image.

In Step S104, the second face image generating unit 16 generates a plurality of second face images corresponding to a plurality of first face images by performing a process similar to that of Step S4 illustrated in FIG. 6 using the feature of the makeup of the user extracted for each first face image.

In Step S105, the presentation unit 17 presents the plurality of second face images generated in Step S104 to the user.

For example, there is a case in which the user prepares a plurality of avatars to which makeups of a plurality of variations (types) have been applied for the same pattern (for example, "a going-out time of a female in 10's") and wants to select an avatar (that is, a variation of a makeup applied to the avatar) in accordance with a mood of the user at that time.

In other words, although the use is the same, there are a time when a slightly moderate makeup is desired to be selected and a time when a slightly decorative makeup is desired to be selected. According to the first modified example, also for a different use (a second pattern), second face images corresponding to a plurality of variations of makeups generated by a user for the first pattern can be generated and be presented to the user. As a result, for a second pattern other than the first pattern for which the user has generated a makeup, user's selection can be broadened.

(Second Modified Example of Process of Face Image Generation Device)

In a second modified example, similar to the first modified example, the first face image acquiring unit 14 acquires a plurality of first face images corresponding to a first pattern. In addition, the feature extracting unit 15 extracts a feature of a makeup of a user on the basis of a weight according to a use frequency of each first face image. Although the second modified example is the same as the first modified example in that a plurality of first face images corresponding to the same pattern (first pattern) are prepared, the second modified example is different from the first modified example in that only one second face image is generated (in other words, a second face image is not generated for each first face image).

Figure 10:
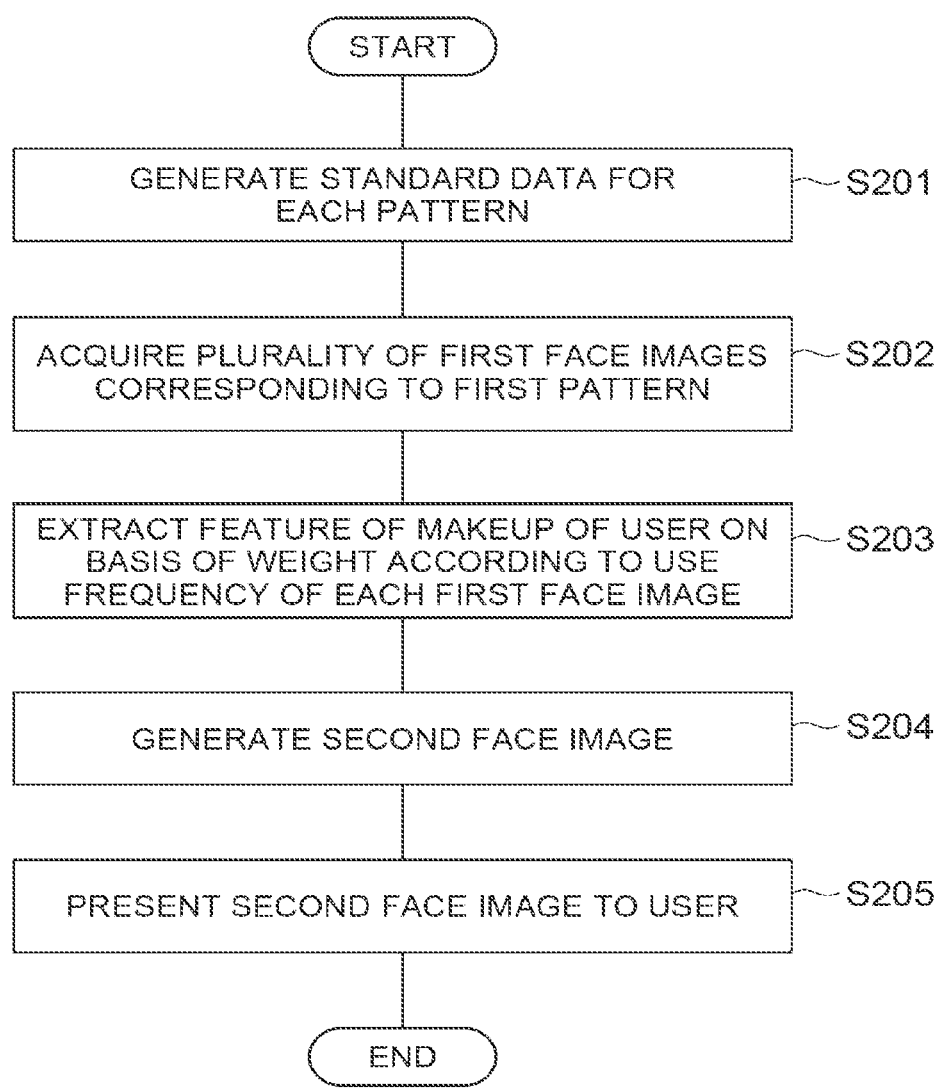
FIG. 10 is a flowchart illustrating a second modified example of the process of a face image generation device.

The process of the second modified example described above will be described with reference to a flowchart illustrated in FIG. 10.

Figure 9:
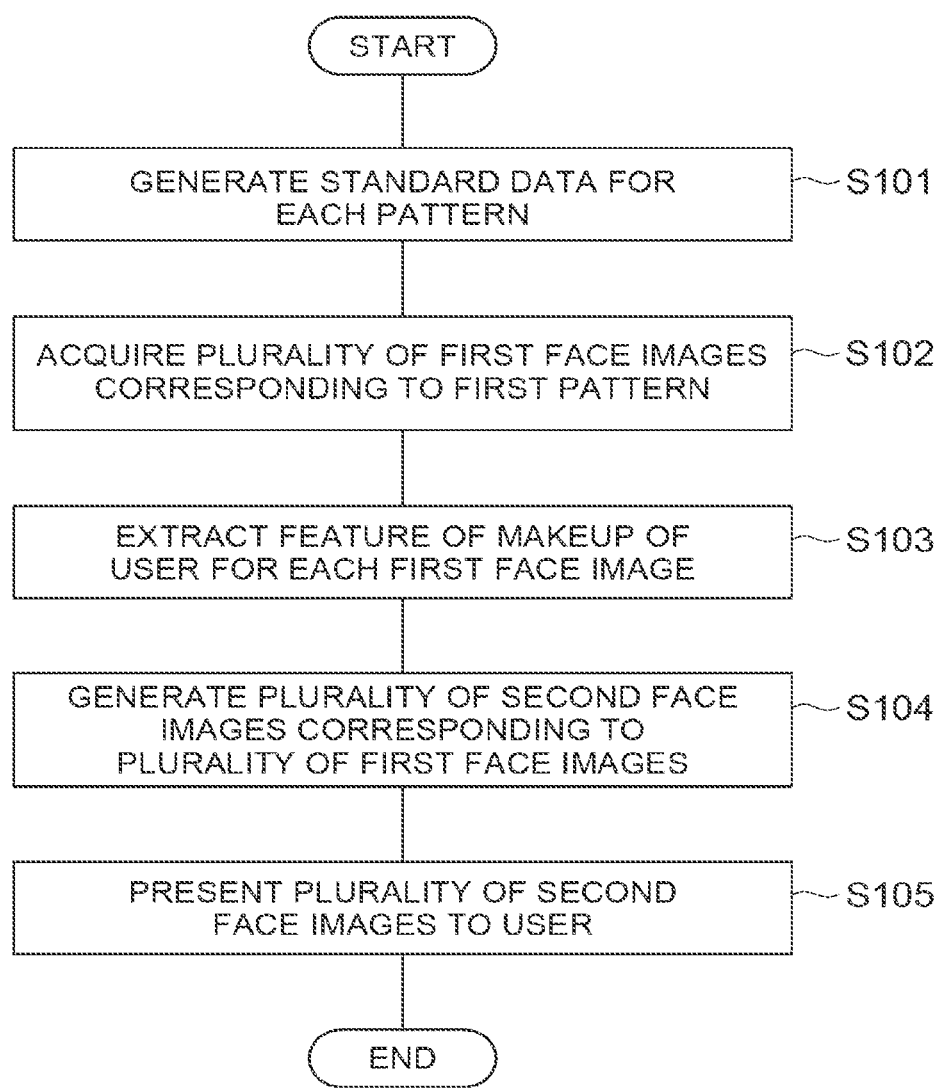
FIG. 9 is a flowchart illustrating a first modified example of the process of a face image generation device.

Processes of Steps S201 and S202 are similar to the processes of Steps S101 and S102 illustrated in FIG. 9.

In Step S203, the feature extracting unit 15 extracts a feature of a makeup of a user on the basis of a weight according to a use frequency of each first face image. The use frequency of the first face image, for example, is the number of times, a time, and the like in which the user applies this first face image to the face image of the avatar. In Step S202, an example of the process of Step S203 will be described using a case in which three types of first face images (hereinafter, denoted as "first face image a", "first face image b", and "first face image c") are acquired as an example. As an example, it is assumed that a ratio of use frequencies of the first face image a, the first face image b, and the first face image c is "F1:F2:F3".

The feature extracting unit 15 respectively converts the first face image a, the first face image b, and the first face image c into a first converted face image A, a first converted face image B, and a first converted face image C of the standard size. At this time, it is assumed that values of the parameter "length" of the makeup target portion "eyebrow" of the first converted face image A, the first converted face image B, and the first converted face image Care V1, V2, and V3. In this case, for example, by weighting the parameter values V1, V2, and V3 of the first converted face images A, B, and C in accordance with use frequencies and then adding the weighted parameters using (Equation 1) represented below, the feature extracting unit 15 determines a representative value V of the parameter "length" of the makeup target portion "eyebrow" of the first converted face image in the first pattern.

$$V = (F1 \times V1 + F2 \times V2 + F3 \times V3)/(F1 + F2 + F3) \quad \text{(Equation 1)}$$

By performing a process similar to the process for the parameter "length" of the makeup target portion "eyebrow" described above for all the parameters of all the makeup target portions, the feature extracting unit 15 determines a representative value of each parameter of each makeup target portion.

Then, the feature extracting unit 15 calculates a deviation degree of each parameter using each parameter value (representative value) of the first converted face image determined as described above. In other words, by performing processes similar to the processes of Steps S35 and S36 illustrated in FIG. 7 using each parameter value (representative value) of the first converted face image determined as described above, the feature extracting unit 15 calculates a deviation degree of each parameter. By performing the processes described above for each parameter of each makeup target portion, the feature extracting unit 15 calculates a feature (a deviation degree) of a makeup of the user for each parameter of each makeup target portion.

Processes of Steps S204 and S205 are similar to the processes of Steps S4 and S5 illustrated in FIG. 6.

According to the second modified example, in a case in which a plurality of face images (first face images) of the avatar corresponding to the first pattern are present, a feature (a deviation degree) of the makeup of the user can be extracted with a feature of each first face image being comprehensively considered in accordance with a use frequency. In other words, it can be expected that a feature (a deviation degree) of the makeup of the user can be extracted with higher accuracy than that of a case in which a feature (a deviation degree) of the makeup of the user is extracted only on the basis of information of some first face images among a plurality of first face images. As a result, it can be expected that user's satisfaction for the second face image that is finally generated and presented can be improved.

(Third Modified Example of Process of Face Image Generation Device)

In a third modified example, the makeup input unit 13 accepts a user's correction of a makeup for a second face image 26 (see FIG. 5) presented to the user by the presentation unit 17. In addition, the storage unit 11 stores correction information relating to a correction that has been accepted by the makeup input unit 13. Furthermore, in a case in which correction information is stored in the storage unit 11, the second face image generating unit 16 generates a second face image 26 further on the basis of this correction information.

Figure 11:
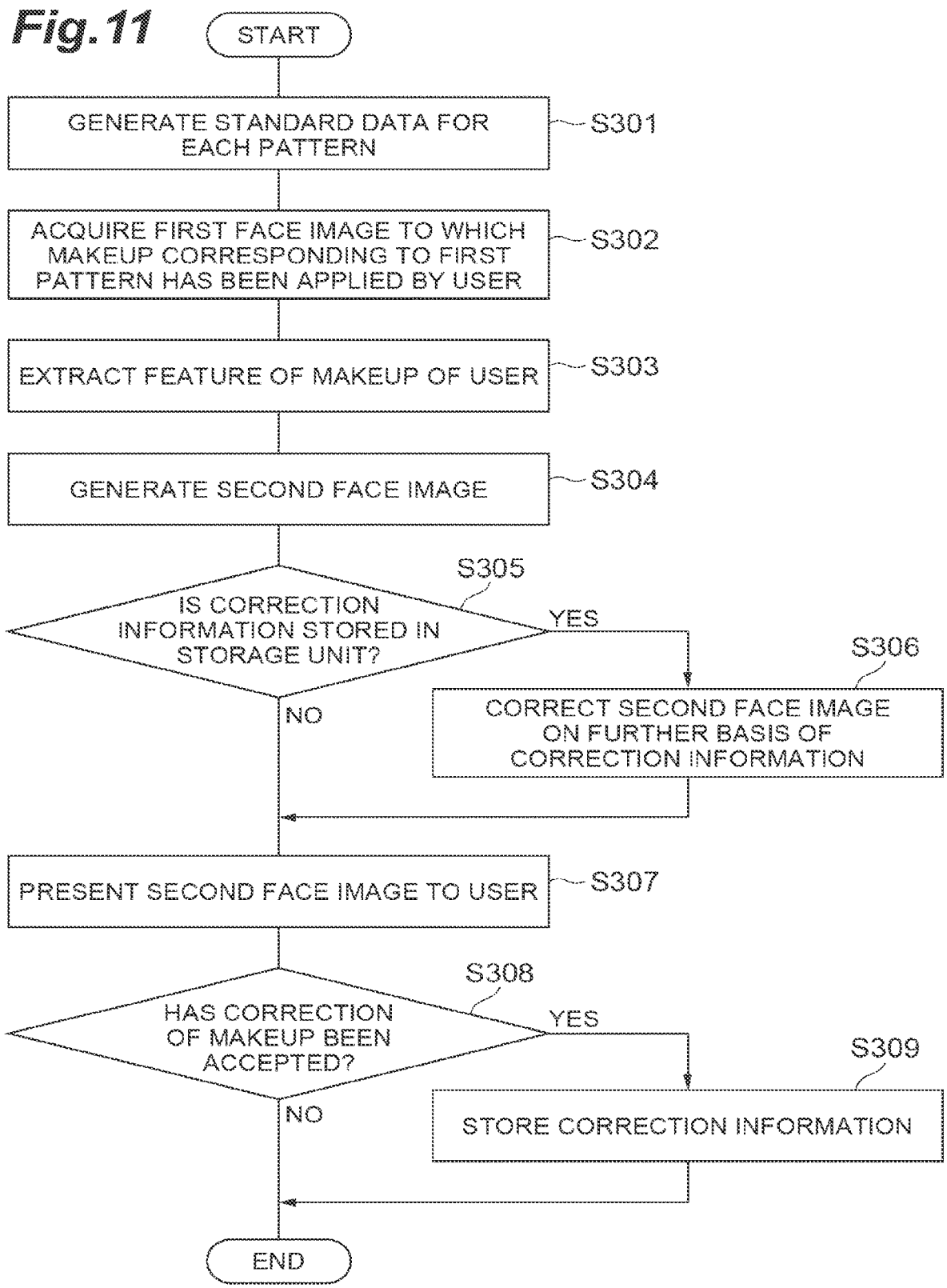
FIG. 11 is a flowchart illustrating a third modified example of the process of a face image generation device.

The process of the third modified example will be described with reference to a flowchart illustrated in FIG. 11.

Processes of S301 to S304 are similar to the processes of Steps S1 to S4 illustrated in FIG. 6.

In Step S305, the second face image generating unit 16 determines whether or not correction information is stored in the storage unit 11. For example, it is assumed that, after a second face image corresponding to a predetermined pattern was presented to a user in the past, a length of an eyebrow has been corrected to have the same length as that of a first face image in the second face image by the user. In this case, correction information representing that "the length of the eyebrow has been corrected to the same length as that of the first face image" may be stored in the storage unit 11. Then, in a case in which such correction information is stored in the storage unit 11 (Step S305: Yes), the second face image generating unit 16 may correct the length of the eyebrow of the second face image generated in Step S304 to the length of the eyebrow of the first face image on the basis of this correction information (Step S306). On the other hand, in a case in which no correction information is stored in the storage unit 11 (Step S305: No), the process of Step S306 is skipped.

In addition, the correction information and the correction process based on the correction information are not limited to those of the example described above. For example, the correction information may be information representing correction amounts (change amounts) of makeup amounts of makeup target portions (for example, a length, a thickness, a width, a depth, and the like) or may be information representing a correction amount (displacement amount) of the position of a makeup of the makeup target portion. In this case, the second face image generating unit 16 may correct a makeup amount or a position of the makeup target portion represented in the correction information on the basis of the correction amount represented in the correction information.

The process of Step S307 is similar to the process of Step S5 illustrated in FIG. 6. After Step S307, in a case in which the user corrects a makeup of the second face image through a user interface provided by the makeup input unit 13 (Step S308: Yes), the storage unit 11 stores correction information relating to this correction (Step S309). On the other hand, in a case in which the makeup of the second face image has not been corrected by the user (Step S308: No), the process of Step S309 is skipped.

The second face image presented to the user in the processes (Steps S1 to S5 illustrated in FIG. 6) of the embodiment described above cannot be necessarily determined to be accepted (liked) by the user as it is. In this case, the user is assumed to correct the second face image through a user interface provided by the makeup input unit 13. For example, it is assumed that, after the second face image of a second pattern "a school commuting time of a female in 10's" is generated using the first pattern "a going-out time of a female in 10's" as a base, the user has made a predetermined correction (for example, a correction for forming the length of the eyebrow to the same length of the first face image) for this second face image. In this case, it is estimated that the user has a strong preference for the length of the eyebrow from this correction.

According to the third modified example, correction information representing that such a correction has been made is stored in the storage unit 11 and is utilized for the process (the process of the second face image generating unit 16) of the next time and subsequent times. For example, a case in which, after the correction information described above is stored in the storage unit 11, a second face image of another second pattern "a date time of a female in 10's" is generated using the first pattern "a going-out time of a female in 10's time" as a base will be considered. In this case, according to the third modified example, after the second face image is corrected on the basis of the correction information described above in Step S306, a second face image after the correction can be presented to the user in Step S307. According to the configuration described above, there is no user's effort for the same correction for the second face image that has been generated and presented at each time, and thus the user's convenience can be effectively improved.

In addition, in order to raise the degree of user's freedom of selection, in Step S307, the presentation unit 17 may present also a second face image immediately after generation in Step S304 (that is, the second face image before the correction of Step S306) to the user together with presenting the second face image corrected in Step S306 to the user. In the process described above, also in a case in which the makeup has been corrected in a direction not preferred by the user in accordance with the correction process of Step S306, the user is allowed to be able to select the second face image before the correction (the second face image immediately after generation in Step S304).

Other Modified Example

In the embodiment described above, although the face image generation device 10 is used for generating a face image of an avatar defined in a virtual space, the face image generation device 10 may be used for generating a face image other than that described above. For example, the face image generation device 10 may be used for generating a user's face image set in a social networking service (SNS), a membership site such as a marriage partner site, or the like. Alternatively, the face image generation device 10 may be used for generating a user's face image set in a video call or a service such as chatting or the like. In addition, a face image generated by the face image generation device 10 is not limited to the face image of the user himself or herself (including the avatar). For example, the face image generation device 10 may be used for generating a face image of a character operated by the user in a virtual space. In addition, in the embodiment described above, although information (an average and a dispersion) relating to a distribution of features of a makeup for each makeup target portion as standard data corresponding to each pattern has been illustrated, standard data corresponding to each pattern may be information other than that described above. In other words, standard data corresponding to each pattern may be data that can be used for a comparison of features of a makeup with a face image (a first face image) to which a makeup has been applied by the user and may not include information relating to the distribution illustrated in the embodiment described above.

In addition, the face image generation device 10 may not necessarily include all the functional units described above (the storage unit 11, the standard data generating unit 12, the makeup input unit 13, the first face image acquiring unit 14, the feature extracting unit 15, the second face image generating unit 16, and the presentation unit 17). For example, standard data corresponding to each pattern may be prepared in advance by a separate device different from the face image generation device 10. In such a case, the standard data of each pattern generated by the separate device described above may be stored in the storage unit 11 in advance, and the face image generation device 10 may download standard data of each pattern from the separate device described above as necessary. In this way, in a case in which standard data is prepared by a separate device, the face image generation device 10 may not include the standard data generating unit 12 described above. In addition, in such a case, Step S1 (see FIG. 6), Step S101 (see FIG. 9), Step S201 (see FIG. 10), and Step S301 (see FIG. 11) of the flowchart described above may be omitted.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 12:
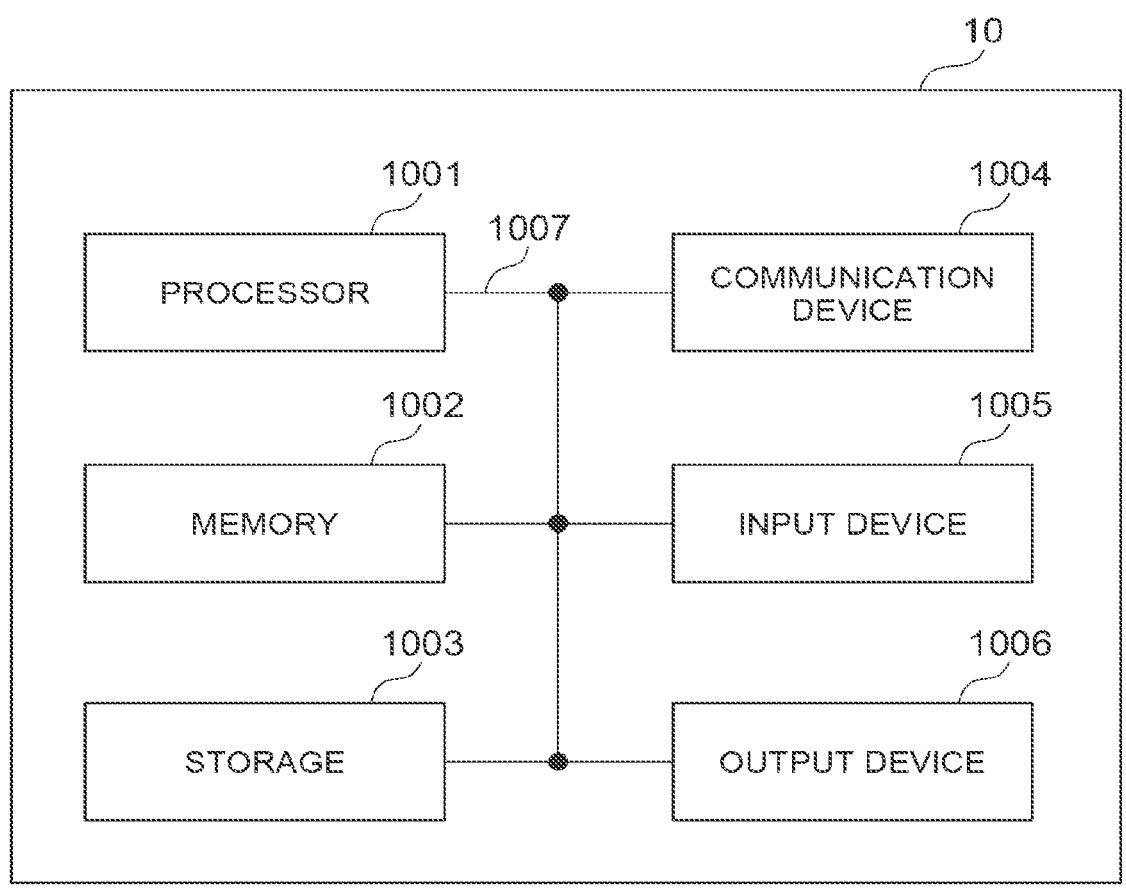
FIG. 12 is a diagram illustrating an example of a hardware configuration of a face image generation device.

For example, the face image generation device 10 according to an embodiment of the present invention may function as a computer that performs face image generation method of the present disclosure. FIG. 12 is a diagram illustrating an example of a hardware configuration of the face image generation device 10 according to the embodiment of the present disclosure. The face image generation device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the face image generation device 10 may include one or a plurality of devices illustrated in FIG. 12, or may be configured without including some of the devices.

Each function in the face image generation device 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the feature extracting unit 15) of the face image generation device 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the face image generation method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the face image generation device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name. Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10 Face image generation device
11 Storage unit

12 Standard data generating unit
13 Makeup input unit
14 First face image acquiring unit
15 Feature extracting unit
16 Second face image generating unit
17 Presentation unit
21 First face image
22 First converted face image
23 First standard data
24 Second standard data
25 Second converted face image
26 Second face image

The invention claimed is:

1. A face image generation device comprising:
processing circuitry configured to
acquire a first face image to which makeup corresponding to a first pattern has been applied by a user;
extract features of the makeup of the user on the basis of the first face image and first standard data relating to features of standard makeup corresponding to the first pattern;
generate a second face image to which makeup corresponding to a second pattern different from the first pattern has been applied by reflecting the features of the makeup of the user extracted by the feature extracting unit in second standard data relating to features of standard makeup corresponding to the second pattern; and
present the second face image generated by the second face image generating unit to the user,
wherein the first standard data includes information relating to a distribution set in advance for the features of the standard makeup corresponding to the first pattern,
wherein the second standard data includes information relating to a distribution set in advance for the features of the standard makeup corresponding to the second pattern,
wherein the first standard data and the second standard data include information relating to a distribution of features of makeup with reference to a face of a standard size set in advance,
wherein the processing circuitry is further configured to:
generate a first converted face image of the standard size by converting the first face image using a conversion rate according to the first face image,
extract the features of the makeup of the user by comparing the first converted face image with the first standard data,
generate a second converted face image of the standard size by reflecting the features of the makeup of the user in the second standard data, and
generate the second face image of a size corresponding to the first face image by performing reverse conversion of the second converted face image using the conversion rate,
wherein the information relating to the distribution of the features of the makeup included in the first standard data and the second standard data includes an average and a dispersion of a parameter relating to makeup of one or more makeup target portions set in advance,
wherein the processing circuitry, for each of the makeup target portions, is configured to extract a deviation degree representing a degree of deviation of the first converted face image from the first standard data as the feature of the makeup of the user on the basis of a value of the parameter in the first converted face image and an average and a dispersion of the parameter in the first standard data, and
wherein the processing circuitry, for each of the makeup target portions, is configured to calculate a correction value on the basis of the deviation degree and the dispersion of the parameter in the second standard data and determine the value of the parameter in the second converted face image by correcting the average of the parameter in the second standard data using the correction value.

2. The face image generation device according to claim 1, wherein the processing circuitry is configured to
acquire a plurality of first face images corresponding to the first pattern,
extract the features of the makeup of the user for each of the first face images,
generate a plurality of second face images corresponding to the plurality of first face images on the basis of the features of the makeup of the user for each of the extracted first face images, and
present the plurality of second face images generated by the second face image generating unit to the user.

3. The face image generation device according to claim 1, wherein the processing circuitry is configured to
acquire a plurality of first face images corresponding to the first pattern, and
extract the features of the makeup of the user on the basis of weights according to use frequencies of the first face images.

4. The face image generation device according to claim 1, wherein the processing circuitry is configured to
accept, from the user, a correction of the makeup for the second face image presented to the user; store, in a memory, correction information relating to correction that has been accepted; and
generate the second face image further on the basis of the correction information in a case in which the correction information is stored in the memory.

5. The face image generation device according to claim 1, wherein the processing circuitry is configured to generate the first standard data and the second standard data,
wherein the first face image and the second face image are face images applied to an avatar of the user in a virtual space shared among a plurality of users, and
wherein the processing circuitry is configured to:
generate the avatar corresponding to each of a plurality of face images to which makeup in the real world has been applied; and
generate the first standard data and the second standard data on the basis of the features of the makeup of a plurality of the generated avatars.

6. The face image generation device according to claim 1, wherein the processing circuitry is configured to generate the first standard data and the second standard data,
wherein the first face image and the second face image are face images applied to an avatar of the user in a virtual space shared among a plurality of users, and
wherein the processing circuitry is configured to generate the first standard data and the second standard data on the basis of features of makeup of a plurality of avatars generated by a plurality of users in the virtual space.

7. The face image generation device according to claim 6, wherein the processing circuitry is configured to update the first standard data and the second standard data on the basis of the makeup of the plurality of avatars generated by the plurality of users within a predetermined period for each predetermined period.

\* \* \* \* \*